UNITED STATES PATENT OFFICE.

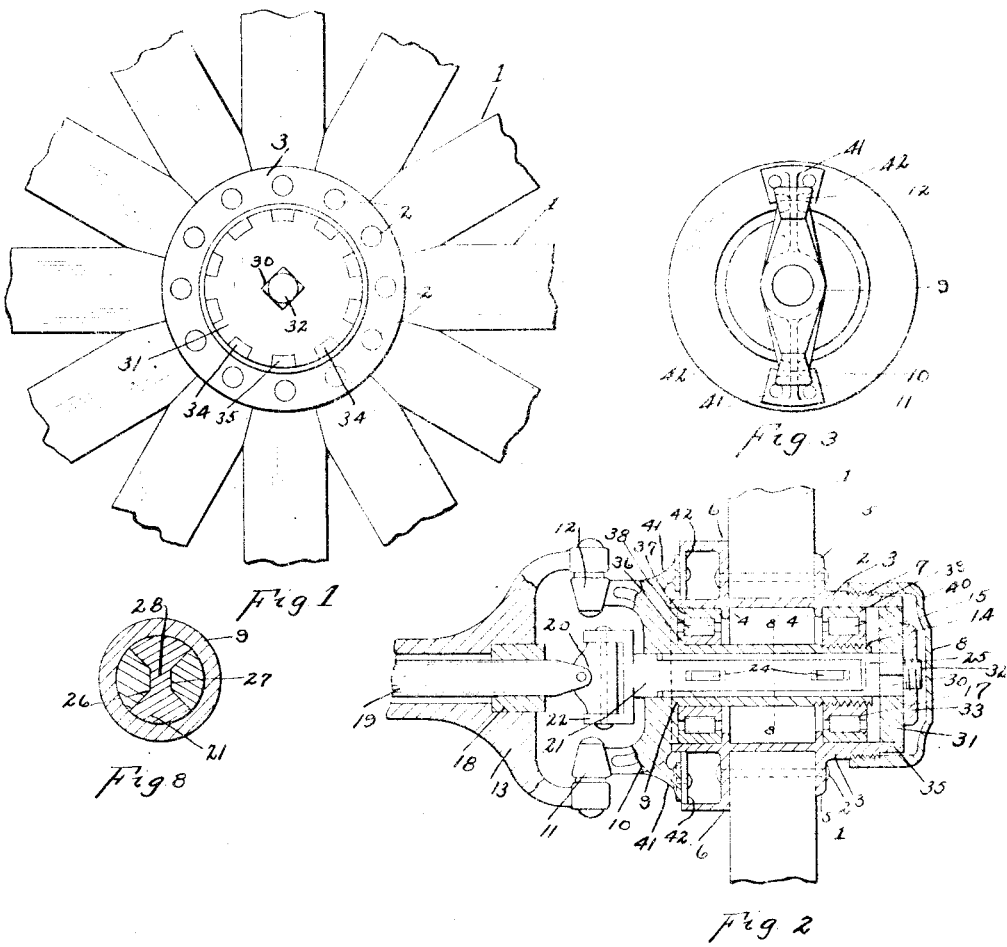

RAY E. SHAFFER, OF COLUMBUS, OHIO.

STEERABLE DRIVING-WHEEL.

1,066,666. Specification of Letters Patent. Patented July 8, 1913.

Application filed November 13, 1911. Serial No. 660,040.

*To all whom it may concern:*

Be it known that I, RAY E. SHAFFER, a citizen of the United States, residing at Columbus, in the county of Franklin and State of Ohio, have invented certain new and useful Improvements in Steerable Driving-Wheels, of which the following is a specification.

My invention relates to steerable driving wheels and is particularly designed for the production of a driving wheel of such a structure as to enable and insure a positive drive at all times and at the same time to permit of steering.

It desirably contemplates the provision of a main driving shaft and a supplemental pivoted driving extension, these elements being coöperative with a supporting sleeve and a supplemental pivoted sleeve extension which serves as a means of support for the said pivoted supplemental driving shaft and an intermediate member between such supplemental shaft and the wheel.

One of the essential features of my invention resides in the provision of an extensible auxiliary driving shaft member, which is automatically operated. The purpose of this is to compensate for the tendency for inward or outward movement when turning at an angle to the normal course.

The preferred form of my invention is shown in the accompanying drawings, in which similar characters of reference designate corresponding parts, and in which—

Figure 1 is a detail view of a wheel with my invention applied thereto and showing the dust excluding cap removed, Fig. 2 is a longitudinal section of the wheel structure shown in Fig. 1, Fig. 3 is a detail view of a peculiar form of dust excluding structure for precluding the entrance of dust to the brake band, Fig. 4 is a plan view of one section of the extensible member, Fig. 5 is a projected elevation of this section, Fig. 6 is a detail view of the complemental section of the extensible member, Fig. 7 is a plan view of the section shown in Fig. 6, and, Fig. 8 is a transverse section of the extensible member in assembled condition and mounted in its supporting sleeve.

In the drawings, I have shown the preferred type of idle wheel utilized by me, which is comprised of spokes designated 1 secured by bolts 2 to a hub 3 having spaced interior annular flanges 4 and exterior flanges 5 and 6. The flange 6 is desirably L-shaped in cross section and is utilized as a casing for an expansion friction brake, being preferably disposed upon the inner side of the hub and a band brake on its external surface. The outer side of the hub is desirably threaded as at 7 for the reception of an internally threaded cap 8. Coacting with the floating wheel, I provide a sleeve 9 integrally formed upon the U-shaped casting 10 pivoted at 11 and 12 to the complemental U-shaped structure of a supporting sleeve 13. The outer extremity of the sleeve 9 is desirably externally threaded as at 14 for the reception of an internally threaded annular ring 15 which is externally channeled to form a seat 17. The sleeve 13 is desirably provided with a bushing 18 for the rotatable support of a driving shaft 19 to which is jointed as at 20 one section 21 of an extensible member. This section 21 has its inner extremity provided with an integrally cast embracing element 22 to form a suitable joint at 20. This section 22 is desirably longitudinally slotted from one end as at 23 and formed of a substantially compound dove-tail contour. This slot 23 is intersected at intervals by pins 24 which are applicable in the assemblage of my wheel and which are designed to be permanent in their nature. Complemental to this section 21 is a section 25 which is provided with opposing grooves 26 and 27 separated by a web 28 which is constructed with spaced slots 29 for the reception of the pins 24 when in assembled condition. The outer extremity of the section 25 is squared as at 30 for the reception of the concentric ring 31 and is further provided with a threaded reduced terminus 32 of an integral nature for the reception of a locking nut 33. The ring 31 has its outer periphery constructed with radially disposed sockets 34 for the reception of lugs 35 carried by the hub member.

In assemblage, it will be seen that the driving or power shaft 19 is supported within the sleeve 13 through the medium of the bushing 18 and that the pivoted extensible members are supported within the sleeve 9 upon the casting 10. The hub of the floating wheel is supported upon this sleeve through the medium of complemental antifriction rings 36 and 37 having opposing channels for the working reception of antifriction cylinders 38. The ring 15 is supplemented in its anti-friction action by a superposed annular ring 39, these two rings forming bearing channels for cylinders 40.

The casting 10 is further provided with offset fingers 41 carrying a disk 42 which fits within the mouth of the casing formed by the L-shaped flange 6 and excludes the dust from the brake carried in such casing.

In operation, it will be seen that power is transmitted to my improved type of wheel by means of the power shaft 19, connection 20, extensible members 21 and 25, ring 31, hub 3 and spokes 1 to the rim of the wheel. The intermediate supporting connection is provided through the medium of the casting 10, sleeve 9 and the interposed anti-friction rings. At the same time, dust is excluded from the brake band casing by means of the disk 42 and from the outer side of the hub, by means of the internally threaded cap 8.

It will be understood that the steering of the wheel, may be effected in any desirable manner. It will also be apparent that the pins 24 are of a comparative size such as to insure a capability of movement in their slots and because of such capability there is effected an automatic adjustment in rounding corners.

What I claim, is—

1. A steerable driving wheel comprising a rotatable power shaft, a supporting element for the rotatable shaft, a pivoted element upon said power shaft having longitudinal grooves oppositely disposed, a complemental member interfitting in said grooves, a wheel, and an intermediate support carried by said wheel enveloping said pivoted element and its complemental member to form a driving connection and pivoted upon said supporting element.

2. A steerable driving wheel comprising a rotatable power shaft, a supporting element for the rotatable shaft, a pivoted element upon said power shaft having longitudinal grooves on opposing sides and having the separating web of such grooves slotted, a complemental member interfitting in the said grooves, pins carried by said complemental member and fitting adjustably in said slots, a wheel, and an intermediate support pivoted upon said supporting element.

3. A steerable driving wheel comprising a rotatable power shaft, a supporting element for the rotatable shaft, a pivoted element upon said power shaft having longitudinal grooves oppositely disposed and having the separating web of such grooves slotted, a complemental member interfitting in said grooves, pins carried by said complemental member and longitudinally adjustable in said slots, a squared end on said complemental member, a wheel, an intermediate support carried by said wheel and pivoted upon said supporting element, and a ring member carried by said squared end and in driving engagement with said intermediate support.

In testimony whereof I affix my signature in presence of two witnesses.

RAY E. SHAFFER.

Witnesses:
 WALTER E. L. BOCK,
 A. L. PHELPS.